United States Patent [19]

Kuhn

[11] Patent Number: 5,896,463
[45] Date of Patent: *Apr. 20, 1999

[54] METHOD AND APPARATUS FOR AUTOMATICALLY LOCATING A REGION OF INTEREST IN A RADIOGRAPH

[75] Inventor: Gary Kuhn, Princeton, N.J.

[73] Assignee: Siemens Corporate Research, Inc., Princeton, N.J.

[*] Notice: This patent is subject to a terminal disclaimer.

[21] Appl. No.: 08/792,720

[22] Filed: Jan. 29, 1997

Related U.S. Application Data

[62] Division of application No. 08/724,112, Sep. 30, 1996.

[51] Int. Cl.⁶ ................................................ G06K 9/00
[52] U.S. Cl. .......................... 382/133; 382/172; 382/299
[58] Field of Search ................................. 382/128, 133, 382/171, 172, 270, 271, 298, 299; 128/922

[56] References Cited

U.S. PATENT DOCUMENTS

| | | | |
|---|---|---|---|
| 4,851,984 | 7/1989 | Doi et al. | 364/413.13 |
| 4,887,305 | 12/1989 | Shimura | 382/51 |
| 4,907,156 | 3/1990 | Doi et al. | 364/413.13 |
| 5,046,118 | 9/1991 | Ajewole et al. | 382/51 |
| 5,133,020 | 7/1992 | Giger et al. | 382/6 |
| 5,319,549 | 6/1994 | Katsuragawa et al. | 364/413.13 |
| 5,343,390 | 8/1994 | Doi et al. | 364/413.16 |
| 5,410,617 | 4/1995 | Kidd et al. | 382/51 |
| 5,452,367 | 9/1995 | Bick et al. | 382/128 |
| 5,537,485 | 7/1996 | Nishikawa et al. | 382/130 |
| 5,596,654 | 1/1997 | Tanaka | 382/168 |
| 5,638,458 | 6/1997 | Giger et al. | 382/132 |

FOREIGN PATENT DOCUMENTS

| | | | |
|---|---|---|---|
| WO 95/15536 | 6/1995 | WIPO | G06K 9/00 |
| WO 95/26682 | 10/1995 | WIPO | A61B 6/03 |

OTHER PUBLICATIONS

Abdel–Mottaleb et al., "Locating the Boundary Between the Breast Skin Edge and the Background in Digitized Mammograms," 3rd Int'l Workshop on Digital Mammography, Univ. of Chicago, Chicago, IL, Jun. 9–12, 1996, p. 66.

Karssemeijer, "Adaptive Noise Equalization and Image Analysis in Mammography," Information Processing in Medical Imaging, 13th International Conference, IPMI '93, Flagstaff, AZ, Jun. 14–18, 1993, pp. 472–475.

Karssemeijer, "Adaptive Noise Equalization and Recognition of Microcalcification Clusters in Mammograms," Int'l Journal of Pattern Recognition and Artificial Intelligence, vol. 7, No. 6 (1993) pp. 1357–1376.

*Primary Examiner*—Andrew W. Johns
*Attorney, Agent, or Firm*—Lawrence C. Edelman

[57] ABSTRACT

A method and apparatus for automatically locating a desired region of interest (ROI) in an original digital image having a plurality of pixel intensity values, comprising:

(a) obtaining digital image intensity data representative of an original digital image;

(b) sampling the digital image intensity data of the original digital image so as to define a reduced digital image representative of the original digital image;

(c) forming an image intensity histogram using the reduced digital image;

(d) determining a threshold image intensity value from the histogram as being representative of a minimum image intensity value of a desired ROI;

(e) creating a mask image from the reduced digital image, the mask image having image pixels at grid coordinate positions corresponding to similarly positioned pixels in the original digital image, by setting all image pixels in a mask image grid to one of at least a maximum and a minimum intensity value, depending upon a comparison of the threshold intensity value to the image intensity value of a correspondingly positioned pixel in the original digital image; and (f) processing the mask image so as to define at least one contiguous area of pixels in the mask image having a common intensity value, the at least one area comprising the desired ROI.

17 Claims, 8 Drawing Sheets

METHOD AND APPARATUS FOR AUTOMATICALLY LOCATING A REGION OF INTEREST IN A RADIOGRAPH

This is a divisional, of application Ser. No. 08/724,112 filed Sep. 30, 1996 pending.

BACKGROUND OF THE INVENTION

1. Field of the Invention

The present invention relates a method and apparatus for automatically locating a region of interest in a radiograph, and more particularly to a method and apparatus for automatically locating a region of interest in a digitized mammogram.

2. Description of the Prior Art

A potential advantage of digital radiography is the capability for quantitative analysis of image data representing normal and abnormal patterns, and the subsequent use of this data to aid radiologists' diagnoses. For example, digital image analysis techniques are known for detecting microcalcifications in mammograms, lung nodules in chest radiographs and for tracking opacified vessels, as well as use in other types of imaging modalities. Since digital image analysis techniques tend to be computationally intensive, and the number of image elements (pixels) in a digital image typically ranges from a minimum of several hundred thousand to tens of millions, digital image analysis tends to be a time consuming and cumbersome "number crunching" process.

One way to reduce the computational demands required for digital image analysis is to reduce the area of the digital image that is analyzed to only a desired region of interest (ROI). By processing only the image intensity data in the digital image that is within the ROI, digital image analysis can be accomplished more efficiently and effectively, and thereby made economically possible for uses such as large scale radiographic image screening of the public for biological abnormalities. For example, since radiographic images typically contain intensity data corresponding to portions other than the patient being imaged, such as the name of the patient, the name of the doctor, and the name of the facility where the radiographic images were generated, these portions of the radiographic image should not be processed by the digital image analysis techniques used for detecting the biological abnormalities, thereby saving a substantial amount of image processing resources and time. Thus, the desired ROI, for example the image of the breast in a mammogram, should be selected as fast as possible, and preferably automatically, with minimum or no user intervention and with a minimum amount of signal processing.

Past attempts to determine regions of interest in digital radiographs include both manual and automatic techniques as well as combined manual/automatic techniques. As is well known, manual techniques require, for example, the user to view the digital image on a computer display, and to mark the ROI, the breast boundary, using, i.e., a light pen. Completely manual techniques for finding an ROI are undesirable due to the extent of manual intervention by the user. U.S. Pat. No. 4,851,984 relates to an automatic method for finding an ROI, and in particular, inter-rib spaces for lung texture analysis. However, in view of the lack of "ribs" in mammographic images, the processing described in the '984 patent is more complex than is required for finding an ROI in a less complex image, such as in a mammogram. Patents have also issued which relate to image processing techniques for digital mammograms wherein the image intensity data is analyzed for the purpose of detecting microcalcifications, such as U.S. Pat. Nos. 5,491,627 and 4,907,156. However, all of the digital image data is processed by the technique described in these patents so as to perform a very high spatial resolution analysis of the digital mammogram, a very computationally complex process. An automatic and reliable ROI finder for subsequent use by such image processing techniques is not shown or suggested thereby.

U.S. Pat. No. 5,452,367 describes an automatic method for finding a desired region of interest in a medical image by analyzing a global histogram of intensity values representative of the medical image. Unfortunately, this technique is very computationally intensive. It needs every one of the potentially tens of millions of intensity values in the medical image, to 1) smooth each pixel with a median filter, 2) calculate the range of neighboring intensity values around each pixel, 3) calculate an intensity histogram over all pixels, 4) calculate a second histogram over all pixels with a small range of neighboring intensity values, and 5) make a full-size 3-level mask image indicating a) dark pixels with small range of neighboring intensity values, b) pixels with large range of neighboring intensity values, and c) bright pixels with small range of neighboring intensity values.

It would be desirable to provide an efficient and effective ROI finder, especially for mammographic ROI's, that permits high spatial resolution digital image analysis to be performed only on the ROI, and that can be implemented into a large-scale screening program for the general public. Accordingly, an automatic technique for more simply locating a desired ROI in a mammographic image would be particularly useful. As will be explained below, the present invention applies techniques which permit a significant down-sampling of the image without filtering, resulting in the simple, direct use of e.g. only 11,000 pixels out of a medical image of 45,000,000 pixels, and run-times on a standard workstation of the order of 1 to 2 seconds per image.

Reliable identification of a desired ROI in a digitized image, such as a mammogram, is not straightforward, in view of variations in the following: film response, the bit-depth of the image digitizing scanner, the resolution of the image digitizing scanner, the total size of the image, clustering of image intensity levels, image statistics which are sub-sampled for speed, prior probability of the desired signal (i.e., the body signal) versus background noise, divergence of noise and signal intensity levels, the presence, orientation and size of identifying name tags, etc., overlap of objects in the image, number of objects in the image, and uniformity of density in the region of interest.

It would be desirable to provide a less computationally complex ROI finder which will accurately identify a desired ROI in a radiographic image, work with digitized radiographic images of any size, including those having a wide variation in signal to noise level, and specifically eliminate non-desired objects, such as name tags, etc. located therein.

SUMMARY OF THE INVENTION

A method and apparatus for automatically locating a desired region of interest (ROI) in an original digital image having a plurality of pixel intensity values, comprising:

(a) obtaining digital image intensity data representative of an original digital image;

(b) sampling the digital image intensity data of said original digital image so as to define a reduced digital image representative of said original digital image, said reduced digital image comprising a sub-set of the digital image intensity data of the original digital image;

(c) forming a histogram using said sub-set of image intensity data, wherein one axis of said histogram indicates increasing image intensity value and an orthogonal axis of said histogram indicates increasing image pixel count;

(d) determining a threshold image intensity value from said histogram as being representative of a minimum image intensity value of a desired ROI; and (e) creating a mask image from said sub-set of digital image intensity data, said mask image having image pixels at grid coordinate positions corresponding to similarly positioned pixels in said original digital image, by setting all image pixels in a mask image grid to one of at least a maximum and a minimum intensity value, depending upon a comparison of the threshold intensity value to the image intensity value to the image intensity value of a correspondingly positioned pixel in the original digital image; and (f) processing said mask image so as to define at least one contiguous area of pixels in said mask image having a common intensity value, said at least one area comprising the desired ROI.

In a preferred embodiment, step (a) includes the step of compressing the sampled digital image intensity data of the original digital image.

DETAILED DESCRIPTION OF THE INVENTION

Figure 1:
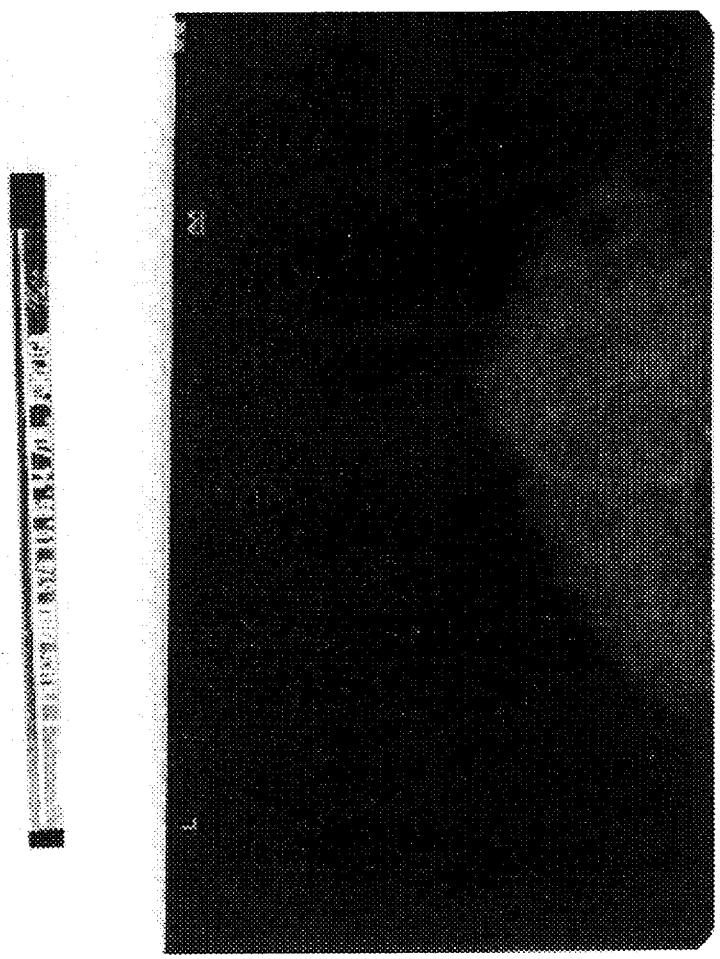
FIG. 1 illustrates the image of a digitized mammogram which is used as the starting point for processing in accordance with the invention for locating a desired ROI.

FIG. 1 illustrates the image of a digitized mammogram which is used as the starting point for processing by the invention for locating a desired ROI, i.e., for locating that portion of the digitized mammogram representative of the breast image. The illustrated image was developed by passing the developed x-ray film (19 cm by 25 cm) through an optical scanner having 770 pixels per inch and providing a digital output of 15 bits for each pixel representative of an image intensity. The pixel size thus corresponds to 33 micrometers, and a scanned image is created containing 5768×7740 pixels of image intensity data, for a total of 44,644,320 pixels.

Figure 2:
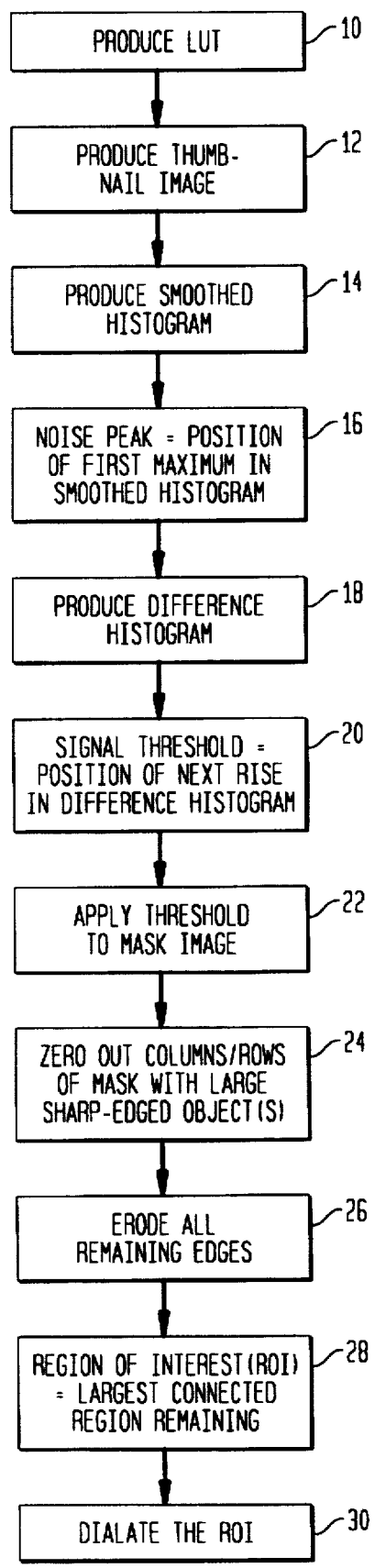
FIG. 2 illustrates a flow chart for a ROI finder constructed and operating in accordance with the principles of the invention.

FIG. 2 illustrates a flow chart for a region of interest (ROI) finder constructed and operating in accordance with the principles of the invention. The first step, step 10, comprises producing a look-up table (LUT) for applying a log compression of the intensity values developed by each pixel of the digitized mammogram to a small subset of the pixels that will actually be used, as will be described in detail later. A main purpose of the compression is to aid in the discrimination between background noise and weak signal data. Although in the preferred embodiment log compression to the base 10 is used, in a specific application, compression in accordance with a different characteristic may be more appropriate. For example, the device making the digital image from the film may have its own form of compression built therein. In general, at least a log compression to the base 10 of the original film response characteristic (assuming the optical scanner does not introduce its own compression) is desired for best aiding the discrimination between background noise and weak signal data. Additionally, compression serves to overwhelm the differences between various response curves for the radiographic film.

The LUT is generated by starting with an input from the user of the number of bits (r) provided by the scanner for the intensity values, and from that number determining the total number (n) of different pixel intensities which may be represented by that number of bits. This is accomplished in accordance with the following equation:

$$n=2^r \qquad [1]$$

Thereafter, the compression factor needed to convert the n different intensity values to, for example, 256 intensity values, logged to the base 10, is calculated as follows:

$$p=255/\log 10(1+n) \qquad [2]$$

The entries (i) for the LUT, ranging from i=0 to i=n−1, are then calculated as follows:

$$LUT(i)=p^* \log 10(i) \qquad [3]$$

This will produce an n-long LUT to accomplish the desired compression.

Figure 3:
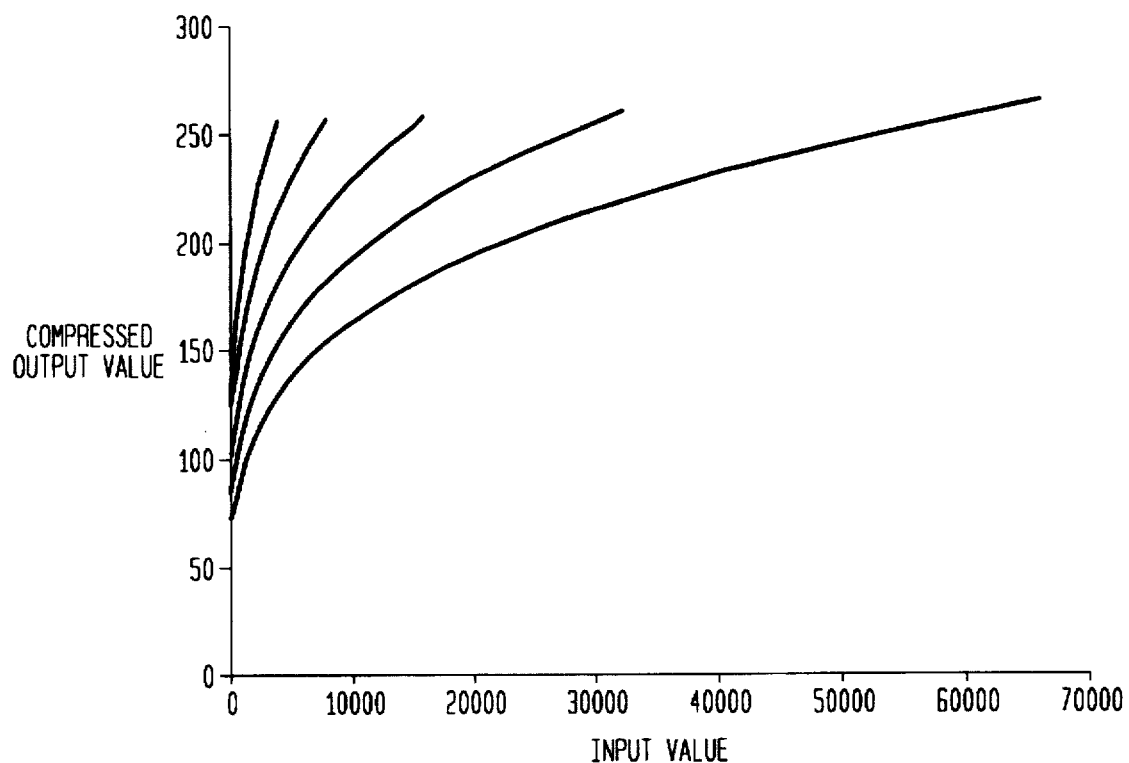
FIG. 3 illustrates a gain-transfer characteristic for compressing the image intensity data of the mammogram in FIG. 1.

FIG. 3 illustrates a plurality of response curves programmed into a RAM look-up table (LUT) for compressing to 8bits scanned intensities having a respective plurality of various bit-depths, for example bit-depths ranging from 12 to 16 bits.

The next step of the invention, step 12 of FIG. 2, comprises producing a "thumbnail" or reduced image. The thumbnail image comprises a set of image data which is substantially reduced from the original image data set, such as a reduction from approximately 45,000,000 pixels to approximately 11,000 pixels. This reduction is accomplished by direct sub-sampling of the original image data, as next described.

Firstly, the length ($\mu$) of the side of each scanned pixel, measured in micrometers, is used to compute the largest number of bit-shifts (b) for converting pixel coordinates in the original image to grid coordinates in the much smaller thumbnail image that is consistent with retaining a specific grid resolution sufficient for accurately defining the desired region-of-interest. Thus, each grid coordinate of the thumbnail image represents an entire block of pixels at a corresponding position in the original image. Our experience indicates that the preferred embodiment should provide a thumbnail grid resolution of approximately 1.5 millimeters, or 1/100th of the lesser dimension of the image, whichever is smaller.

Thus, if a grid resolution of 1.5 mm is used, b is computed as follows:

$$b = \text{int}(\log 2(1500/\mu)) \qquad [4]$$

Next, using the width (w) and height (h) of the original scanned image, in conjunction with the variable b calculated above, the required number of x and y grid positions to make the thumbnail image is computed. That is, the size, $s_x$ and $S_y$, in x and y coordinates to be used for both the thumbnail image and a "mask" image (to be described in detail later), is computed in a manner so as to (a) assure a desired resolution, and (b) not exclude partial grid blocks corresponding to the right and bottom edges of the original image. sx and sy are computed as follows:

$$s_x = w * 2^{-b} \qquad [5]$$

$$s_y = h * 2^{-b} \qquad [6]$$

$$\text{if } (s_x < w/2^{-b}), \text{ then } s_x = s_x + 1 \qquad [7]$$

$$\text{if } (s_y < h/2^{-b}), \text{ then } s_y = s_y + 1 \qquad [8]$$

Next, sample with compression (using the LUT) and store, as a sub-set, only the pixel intensities from the coordinates of the original image which correspond to the upper left corner of each grid block in the thumbnail image, as follows:

$$\text{thumbnail}(i,j) = \text{lut}(\text{image}(i*2^b, j*2^b)) \qquad [9]$$

where i ranges from 0 to $s_y$−1, and j ranges from 0 to $s_x$−1.

For example, if an original mammogram x-ray film is scanned with pixels having a 33 $\mu$m square size and results in digital data measuring 5768×7740 pixels, the thumbnail image will measure only 91–121. So instead of having to read, convert, store and then process all 44,644,320 pixels representative of the original image in order to begin automatic location of the desired ROI, in accordance with this invention it is only necessary to read, convert, store and process 11,011 pixels, and place their logged intensities, one per grid block, into the thumbnail image, in order to begin automatic location of the desired ROI. This corresponds to a spacing of one pixel each 2.1 mm in the original image.

In summary, the purpose of the thumbnail image is to reduce the amount of image intensity data needed to be processed, and hence the computation time needed, for finding the desired ROI. Thus, after compression of the intensity data of the original digital image, the compressed intensity data is directly down-sampled by a factor equal to the largest power of 2 which will produce a predetermined resolution of approximately 1.5 millimeters per pixel or 1/100th of the lesser dimension of the image, whichever is smaller.

Figure 4:
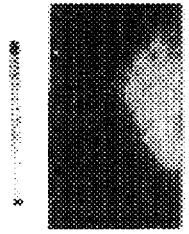
FIG. 4 illustrates a reduced image created by downsampling the image of FIG. 1 after compression of the image intensity data (however, to aid visualization, an enlargement by a linear factor of 16 is used)

Since in the described embodiment the thumbnail image will only contain 91×121 pixels, it is too small to be illustrated clearly. Therefore, FIG. 4 illustrates an enlargement of the thumbnail image by a linear factor of 16, to aid its visualization. Note, in the expanded thumbnail image, since the compressed (i.e., logged) image intensity data was used, the ROI is much brighter and of more uniform intensity. As previously noted, this will aid automatic finding of the ROI. Note also, in an alternative embodiment for very small images, if a reduction in computational time is not needed, this down-sampling step could be eliminated.

Next, a mask image of the same size as the thumbnail image, is created and initialized, by setting the intensity value at the grid positions around the edge of the mask image to 0, and the intensity value of each grid position everywhere else to a 1. The purpose of the mask image, as will become apparent, is to represent the presence or absence of a possible ROI as a function of position in the down-sampled image.

The next step of the invention, step 14 of FIG. 2, comprises producing a smoothed histogram of the logged intensities in the thumbnail image. The histogram will indicate the number of times each of the n possible logged intensity values occurs in the thumbnail image. Thus, only 11,011 values need to be analyzed, not the 44,644,320 of the original data set. In accordance with a preferred embodiment, the logged intensity values of the thumbnail image will be divided by a reduction factor (f) and collected in a small enough number of bins so that the counts in the bins are already somewhat smoothed. In our example, f=4, so only ¼ of the available 8-bit resolution of the thumbnail image will be used, i.e. n/4 different bins. Histogram production is then accomplished automatically in accordance with the following equation:

$$\text{hist (thumbnail } (i,j)/f) = \text{hist (thumbnail } (i,j)/f) + 1 \qquad [10]$$

Next, the histogram of the logged intensities is smoothed by a constant amount in order to overcome the roughness caused by sub-sampling of the intensity vs. count data, regardless of the offset of the noise and signal in the intensity bins of the histogram. This smoothing is accomplished, in accordance with a preferred embodiment, by filtering the histogram twice with a constant q filter having an odd rectangular width of not more than 10% of the width of the histogram. For example, with log compression to 256 different values and histogramming with 256/4=64 bins, smoothing is applied over 5 bins, as follows:

$$\text{smoo1}(i) = (\text{hist}(i-2) + \text{hist}(i-1) + \text{hist}(i) + \text{hist}(i+1) + \text{hist}(i+2))/5, \text{ and} \qquad [11]$$

$$\text{smoo2}(i) = (\text{smoo1}(i-2) + \text{smoo1}(i-1) + \text{smoo1}(i) + \text{smoo1}(i+1) + \text{smoo1}(i+2))/5 \qquad [12]$$

Filtering the histogram twice with a narrow-width filter instead of once with a wider filter results in usable smoothed values closer to the low- and high-intensity edges of the histogram.

Figure 5:
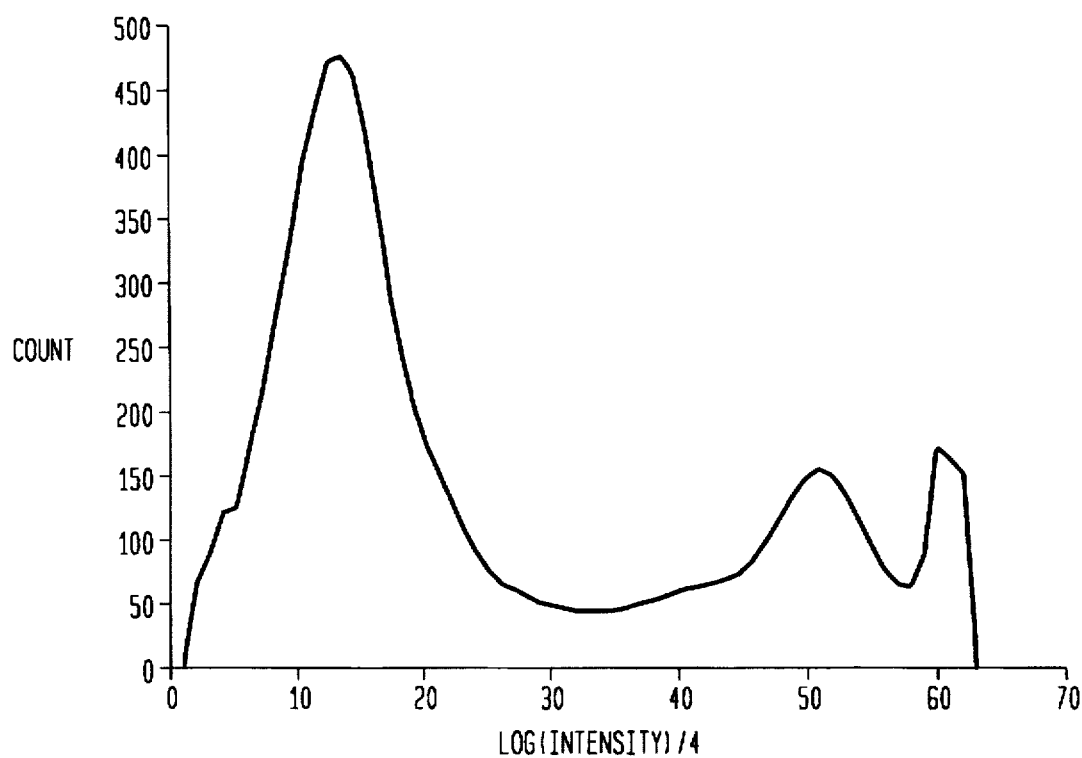
FIG. 5 illustrates a histogram of the compressed image intensity data representative of the FIG. 4 image.

FIG. 5 illustrates a histogram of the compressed intensity data of the thumbnail image produced as indicated above.

The next step of the invention, step 16 of FIG. 2, comprises examining the smoothed histogram to find a peak corresponding to the most frequent intensity of the background noise in the thumbnail image, i.e., the "noise peak".

Differences from image to image in the prior probability of background noise as a function of intensity, change (a) the height of the noise peak in the smoothed histogram, both in absolute terms and in relation to the heights of any peaks associated with signal, and (b) the position of the noise peak along the intensity axis.

Still, the existence of the noise peak is assumed by this invention, which therefore looks for the intensity corresponding to the noise peak by searching in the twice-smoothed histogram from low intensity to high, for the first occurrence of a maximum that gives a fall in intensity, after a given Δ (such as Δ=4), as follows:

$$\text{if } (\text{smoo2}(i-\Delta) > \text{smoo2}(i)), \text{ then NoisePeak}=i \qquad [13]$$

The assumption of a constant width for the noise peak, such as Δ=4, corresponds to the reasonable assumption of a constant bandwidth for the peak.

In the histogram shown in FIG. 5, the first occurrence of a Δ=4 fall in pixel counts occurs at intensity i=15.

Analyzing the histogram of FIG. 5, those intensity values to the left of the noise peak are clearly representative of background noise, while those to the right of the noise peak begin to represent to a greater and greater extent intensity values of imaged signals (objects). Expected signals in a mammogram include, for example, the breast, patient and hospital name-markers, x-ray view descriptors, and borders left unexposed (white).

In accordance with the processing steps to be next described, a signal threshold value will be identified, that is representative of a minimum intensity value that can possibly be from a desired ROI, in order to set values of the mask image to accurately reflect the grid coordinates of all objects which might possibly be the ROI. Thereafter, the mask image is processed to select the desired ROI. The grid coordinates of the desired ROI in the mask image can then be used for identifying the corresponding pixels and their intensities in the original image data. Once this original image data is identified, only this data needs to be processed in order to identify anomalies or other conditions within the desired ROI (rather than all of the intensity data from the original image), thereby enabling such processing to be more efficient and effective.

In accordance with the principles of the invention, the portion of the histogram to the right of the noise peak is processed so as to find the point at which the histogram first exhibits a change in its curvature from negative to positive. Negative curvature corresponds to a decreasing rate of occurrence of noise pixels with increasing intensity, while positive curvature corresponds to an increasing rate of occurrence of signal pixels with increasing intensity. This invention analyses the curvature of the intensity histogram because the intensity peak due to background noise may or may not diverge well from the intensity counts to its right, which start to include counts for the least intense pixels whose intensity is mostly due to the signal. If there is good divergence, a positive slope will be seen in the intensity histogram, when one goes from the noise peak toward the higher intensities. Without good divergence, only a positive curvature will be seen.

In order to accurately estimate a minimum signal intensity for either case, the next step of the invention, step 18 of FIG. 2, comprises producing a difference histogram.

The first step in this process is to smooth the twice-smoothed histogram yet one more time. In our illustrated example this step corresponds to calculating:

$$\text{smoo3}(i)=(\text{smoo2}(i-2)+\text{smoo2}(i-1)+\text{smoo2}(i)+\text{smoo2}(i+1)+\text{smoo2}(i+2))/5 \qquad [14]$$

Figure 6A:
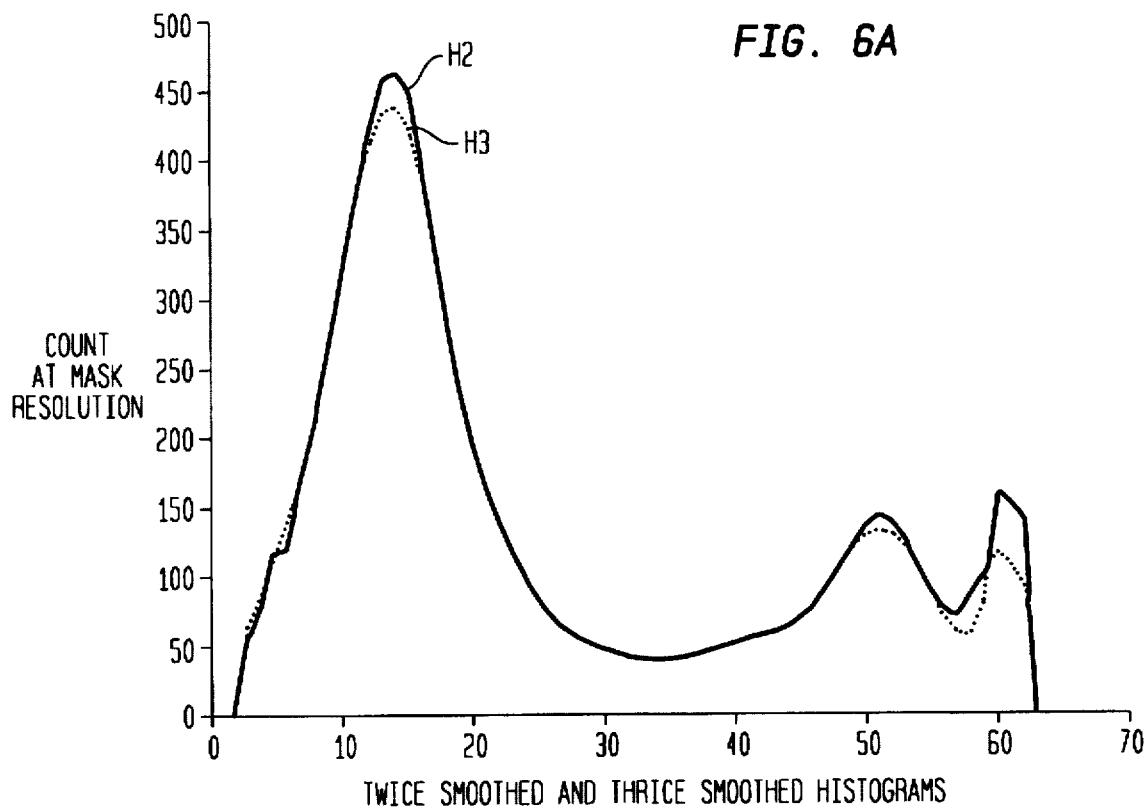
FIGS. 6a, 6b and 6c illustrate the result of processing steps applied to the histogram of FIG. 5 for determining a "threshold" or "minimum signal" intensity that can possibly be from a desired ROI.

The twice-smoothed histogram always has positive curvature as one moves to the right of the noise peak, whether there is a positive slope or not. Where the twice-smoothed histogram has positive curvature, the thrice-smoothed histogram will be above it. Where the twice-smoothed histogram has negative curvature, the thrice-smoothed histogram will be below it. FIG. 6a illustrates the twice-smoothed and thrice-smoothed histograms, histograms H2 and H3, respectively.

The second step in this process, in accordance with this aspect of the invention, is to create a difference histogram, whose purpose is to obtain a positive slope at the intensity position to the right of the noise peak where one finds the counts for the least intense pixels whose intensity is mostly due to the signal. This is accomplished by subtracting the thrice-smoothed histogram from the twice-smoothed histogram, as follows:

$$\text{diff }(i)=\text{smoo2}(i)-\text{smoo3}(i) \qquad [15]$$

Figure 6B:
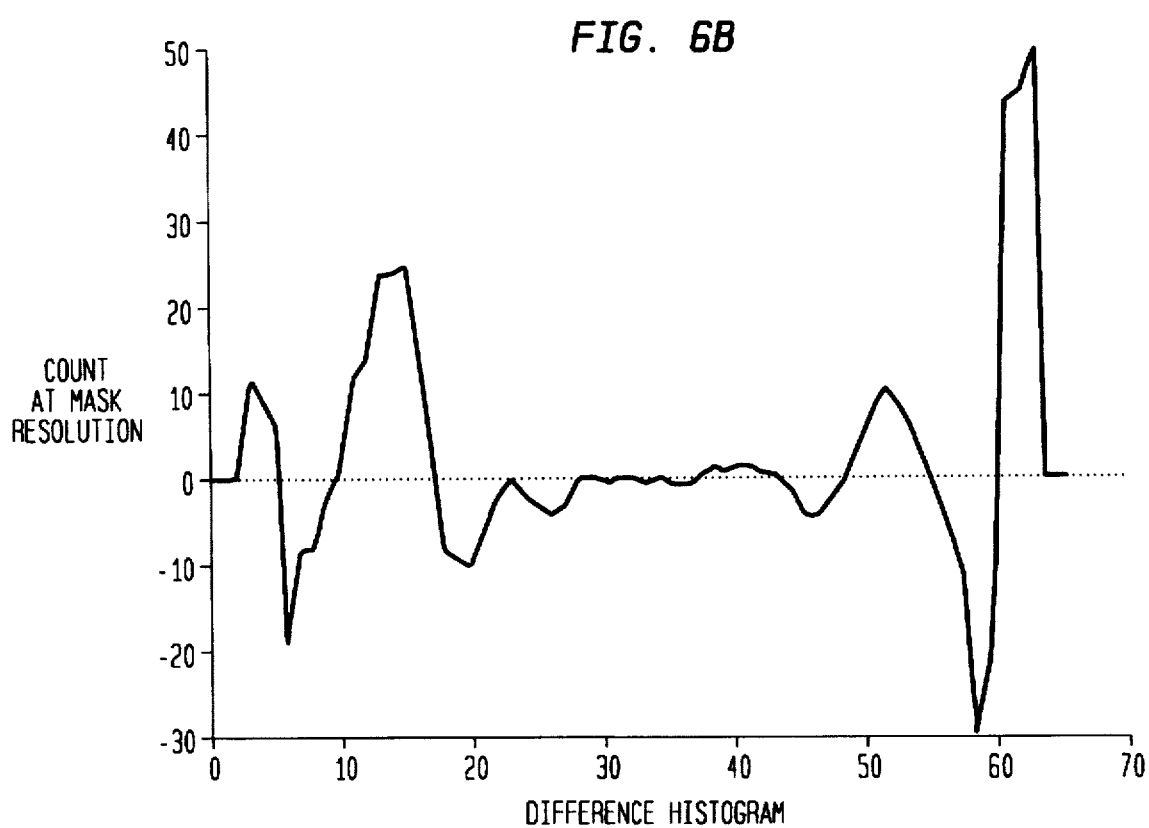

FIG. 6b illustrates the difference histogram produced by subtracting the thrice-smoothed histogram from the twice-smoothed histogram.

Figure 6C:
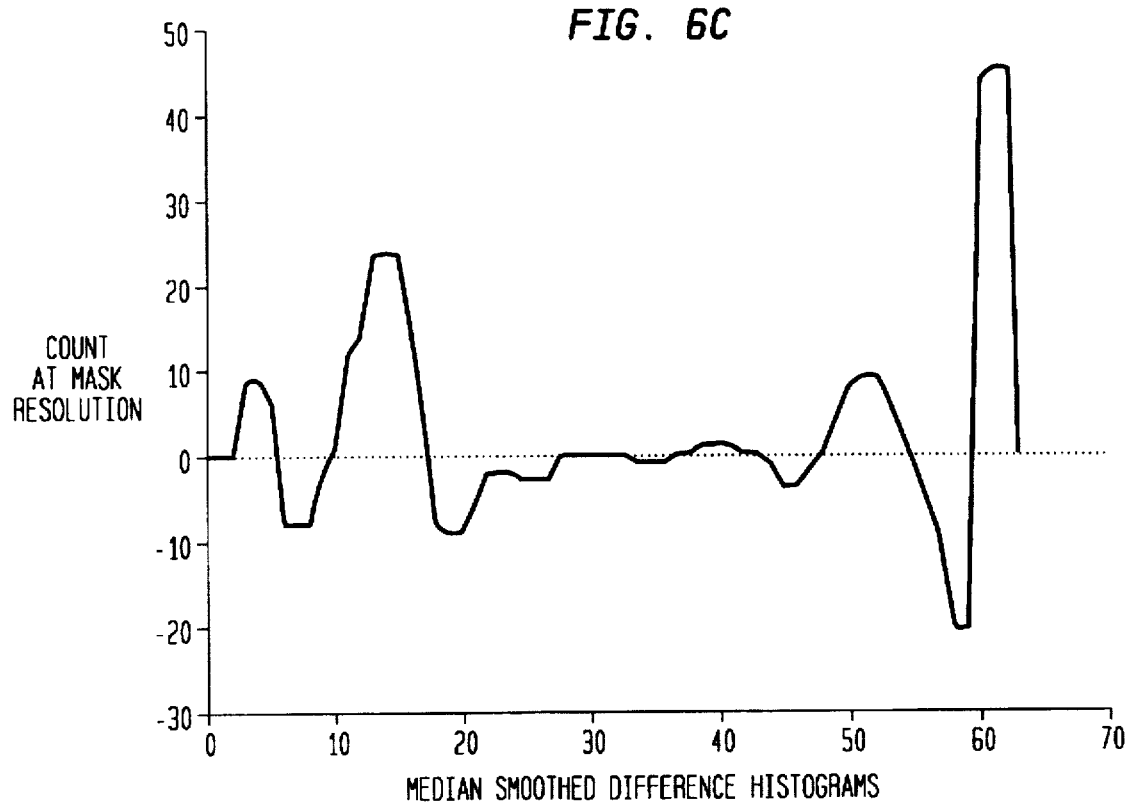

Next, in accordance with a further aspect of the invention, in a preferred embodiment the difference histogram is quickly smoothed with a 3-point median smoother. This additional smoothing is beneficial if the overall signal-to-noise ratio for the whole image is very low. FIG. 6c illustrates the smoothed difference histogram.

The next step of the invention, step 20 of FIG. 2, comprises finding the intensity level representative of the minimum signal intensity level, to be applied as a signal threshold for creating the mask image. The threshold intensity between noise and possibly desired signals can be indicated by finding the first rise in the smoothed difference histogram which occurs to the right of the noise peak. However, because of variations from image to image in the divergence of noise and signal, it is not possible to look a fixed distance to the right of the noise peak and find the best threshold between noise and signal. Also, the width of the minimum to the right of the noise peak in the smoothed difference histogram varies with the overall signal-to-noise ratio for the whole image. Our, experience indicates that the minimum in the smoothed difference histogram is no narrower than 10% of the intensity range from the noise peak to the maximum non-zero count in the histogram.

Therefore, the preferred embodiment of the invention next finds "MaxIntensity", the index of the right-most non-zero count in the smoothed difference histogram (64, as shown in FIGS. 6a–c), and then sets "Δ", the width of the positive slope which will be sought, adaptively, as being 10% of the difference between the x-coordinate at the right end of the intensity histogram (64) and the x-coordinate of the noise peak (15), resulting, in the illustrated example in a value of Δ=4, in accordance with the following equation:

$$\Delta=(\text{MaxIntensity}-\text{NoisePeak})/10 \qquad [16]$$

Next, this invention identifies the best threshold image intensity between noise and signal by finding the first "Δ" rise in the smoothed difference histogram to the right of the noise peak, restoring the original 8-bit intensity resolution:

if(diff(i−ΔA)<diff(i)), then Threshold=f*i  [17]

Depending on the cost of errors for a threshold that is either too low or too high, in an alternative embodiment of the invention, this threshold may also "be biased" (i.e., shifted) by a constant percentage in log intensity by adding a fixed offset a, as follows:

Threshold=Threshold+a  [18]

The next step of the invention, step 22 of FIG. 2, comprises applying the signal threshold to the mask image. Thus, at every position on the grid of the mask image, replace the stored 1 with a 0, if the corresponding logged intensity in the thumbnail image is less than the signal threshold calculated above. This can be accomplished automatically, as follows:

if(thumbnail(i,j)<Threshold), then mask(i,j)=0  [19]

Figure 7:
FIG. 7 illustrates a binary version of the FIG. 4 image, wherein the image intensity of all pixels with less than the threshold intensity are set to zero, and all others are set to one, thereby defining at least one possible ROI.

FIG. 7 illustrates the image resulting from application of the signal threshold to the mask image.

The next step of the invention, step 24 of FIG. 2, comprises deleting from the mask image any rows/columns which are filled with large sharp-edged objects. Since such objects cannot be a desired ROI, they can be removed by setting their grid points in the mask image to 0.

As an example of such sharp-edged objects in digitized x-ray film mammograms, the bright area containing the patient's name tag can exceed the bright area which shows the body. To eliminate the name tag from consideration as a region of interest, the user must supply the percentage P of the height of the image which is covered by, e.g., name tags of the known size. A preferred embodiment of this invention then looks from left to right in the mask image, column by column, for any region of adjacent columns where the percentage of above-threshold grid points changes in accordance with the following characteristic:

(a) rises in less than 1 cm or 5% of the columns, whichever is smaller, to more than P%, and (b) stays above P% in the successively following columns, until it (c) falls by more than ½P% in the following 1 cm or 5% of the columns, whichever is smaller.

If any regions with such adjacent columns are found, the intensity at every grid point in these columns is set to 0. If large sharp-edged objects such as name tags may be found horizontally on an image, then the same steps should also be followed from top to bottom in the mask image, to set the intensity everywhere in the associated rows to 0.

The use of a P% rise/level is necessary if these sharp-edged objects may cover as little as P% of the columns or rows of the image. The use of only a ½P% fall is necessary if, despite the radiologist's best intentions, the breast sometimes overlaps these sharp-edged objects by as much as half of the height (or width) of the image. The use of 1 cm or 5% of the columns (or rows), whichever is smaller, for the rise and fall is necessary because, e.g., name tags are not placed exactly vertically (or horizontally) on an image. In general, the percentage rise and fall should both be adjusted based on the experiences of the user in their particular application.

Figure 8:
FIG. 8 illustrates a modification of the FIG. 7 image, wherein any possible ROI having large, vertical sharp edges is removed.

FIG. 8 illustrates the mask image resulting from removing large, sharp-edged objects in accordance with the above steps.

The next step of the invention, step 26 of FIG. 2, comprises eroding all remaining edges. Dark boundary regions may exist between neighboring bright regions, such as breast and chest or breast and arm, or between body parts and bright unexposed border regions of the mammogram. To decrease the chances that the neighboring regions will be treated as connected, in a preferred embodiment of this invention, all edges in the mask image are eroded.

An edge is defined as a mask grid point which is 1, and for which at least one of its 8 possible neighbor grid points (at "compass" directions N, NE, E, SE, S, SW, W, or NW) is 0. Erosion consists of setting each such mask grid point to 0.

Figure 9:
FIG. 9 illustrates an erosion of the FIG. 8 image, wherein the background region is expanded around the edge of all possible ROI'S.

FIG. 9 illustrates the mask image after erosion of all remaining edges in accordance with the above step.

The next step of the invention, step 28 of FIG. 2, comprises selecting as the region of interest the largest connected region remaining in the mask image. No matter how many above-threshold regions are left in the mammogram, it is assumed that the largest region is the desired region of interest.

Regions are assigned numbers (labels) in the order encountered. Encountered regions are extended when found, toward all neighboring grid points which are above-threshold, until no more unlabelled above-threshold neighboring grid points are found. The region of interest (ROI) is the largest connected region remaining the mask image. To identify the largest region, this invention (a) labels each mask grid point with the number (starting with 1) of any above-threshold region which contains that point, and then (b) sets all the mask grid points in all regions except the largest region to 0, and sets all the mask grid points in the largest region to 1.

The next step of the invention, step 30 of FIG. 2, comprises dilation of the region of interest. Both in the interior of the region of interest and at its edge, the density of the body is non-uniform, which can cause holes in the middle of the region, and clipping at the edge of the region. To decrease the chances that parts of the region of interest will remain excluded, this invention dilates all edges, internal or external, of the region of interest. Again, an edge is defined as a mask grid point which is 1, and for which at least one of its 8 possible neighbor grid points is 0. Dilation consists of setting each such neighbor grid point to 1.

Figure 10:
FIG. 10 illustrates a dilation of the FIG. 9 image, wherein after the largest remaining ROI has been selected as the desired ROI, it's shape is dilated to reverse any effects caused by the erosion of the prior step.

FIG. 10 illustrates dilation of the region of interest in the mask image.

Thereafter, the coordinates or grid points of the region of interest shown in the final mask image, are used to retrieve from the system memory only the original image intensity data corresponding to the found region of interest, thereby eliminating the processing of a substantial amount of intensity data in the original image in order to find anomalies or accomplish other image analysis of the desired region of interest.

Figure 11:
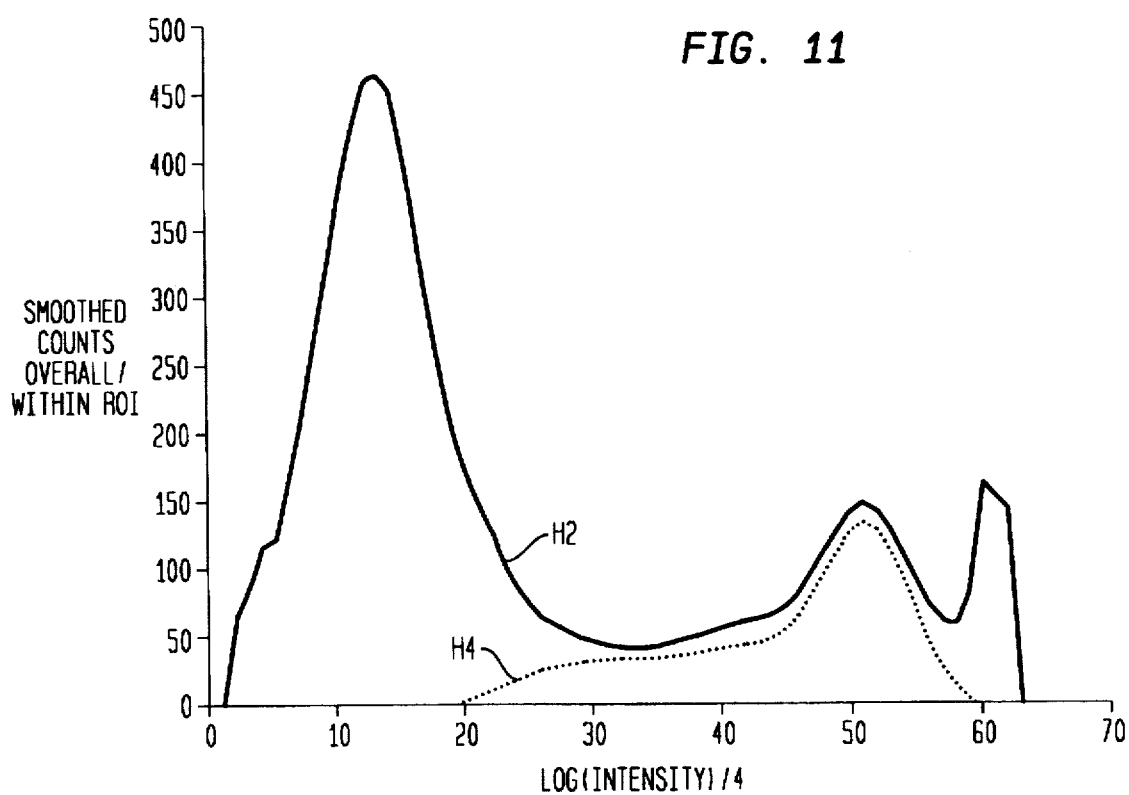
FIG. 11 illustrates a comparison of the histogram of FIG. 5 with a histogram of the compressed intensity data for the pixels forming the finally selected desired ROI.

FIG. 11 illustrates a comparison of the twice-smoothed histogram in the thumbnail image, H2, with the histogram of the intensity data within the found ROI, H4. Note that above the calculated "signal threshold" of the image (at intensity level 21), there is a gradual change in the probability that a given log intensity corresponds to a log intensity in the ROI. This figure shows that our histogram-based invention was able to find the minimum intensity pixels that come from the ROI even though they were only a tiny fraction of all image pixels with that same intensity.

Figure 12:
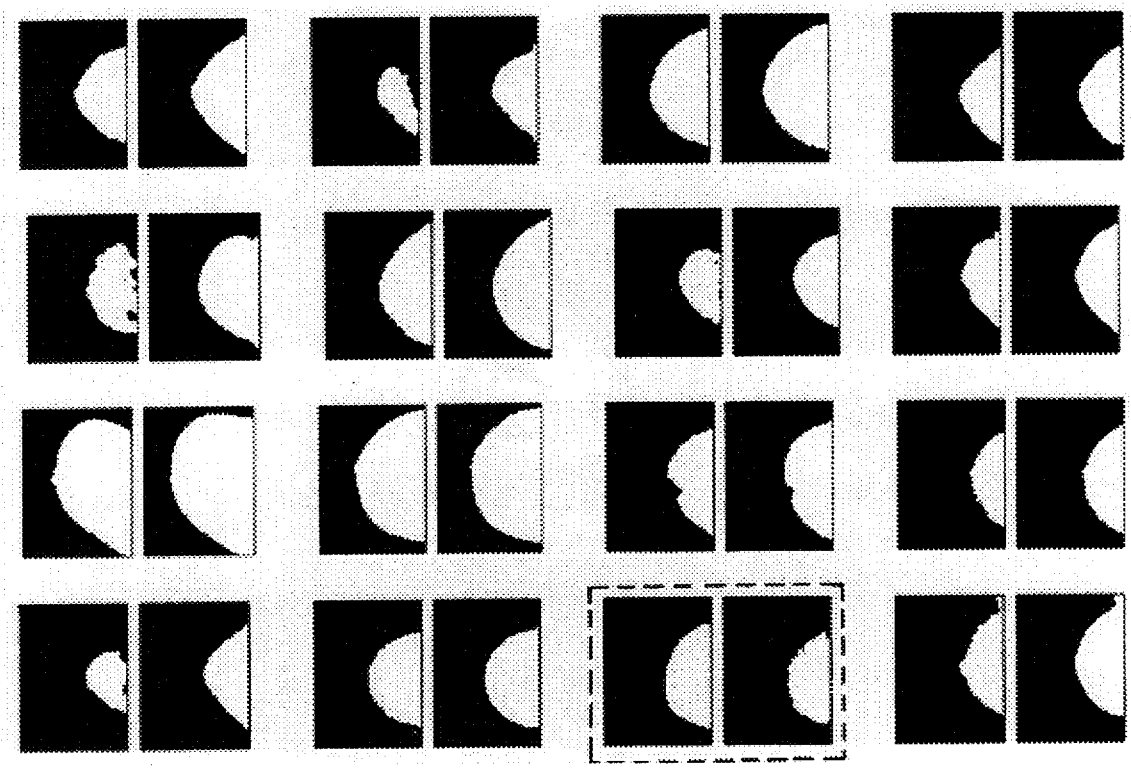
FIG. 12 illustrates a comparison of the results of the present ROI finder, with a prior art ROI finder.

FIG. 12 illustrates a side-by-side comparison of the results of the present ROI finder (right image) with a prior art finder (left image), for 16 different digitized mammograms. Each comparison uses identical original image data. In each case but one, that one indicated by a dashed line surrounding the images, the present invention more accurately located the region of interest in comparison with the prior art technique, as it does for all other mammograms in our 100-patient database.

Importantly, for that one case, the image data was obtained by scanning the x-ray film mammogram with the wrong side toward the light source, resulting in a drastically reduced signal-to-noise ratio, i.e., in a too-small value of MaxIntensity-NoisePeak. In such a situation this invention can be used to flag the unusable digital mammogram, for its unacceptable signal-to-noise ratio.

Figure 13:
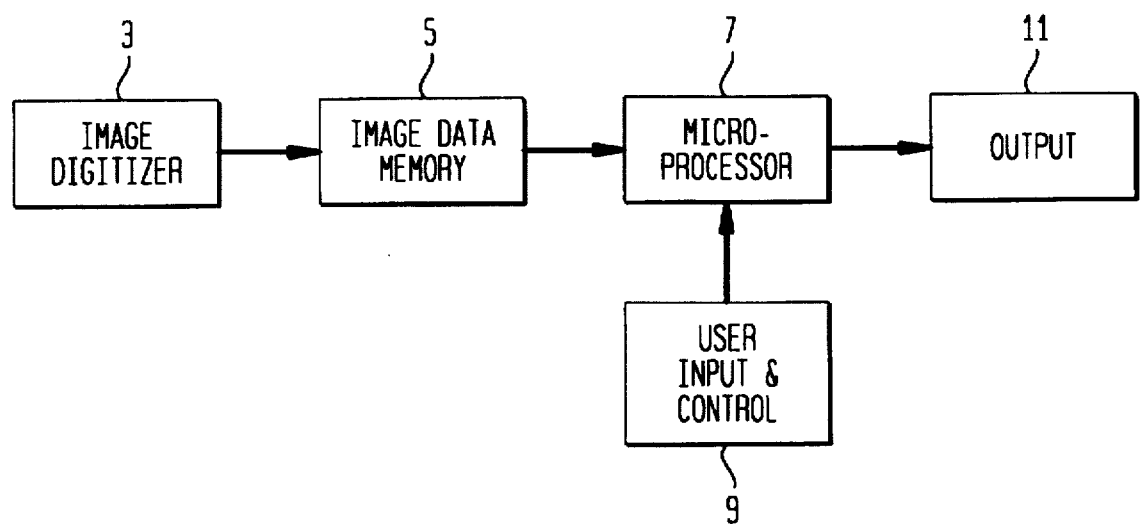
FIG. 13 illustrates an apparatus useful for carrying out the present invention.

FIG. 13 illustrates an apparatus useful for carrying out the present invention. A radiographic film image is input to an image digitizer device 3, such as an optical scanner, for creating a stream of digital values representative of image intensities that define the images on the film. The film may comprise a cranio-caudal x-ray of a breast. The scanner may have, e.g., 770 image conversion elements (pixels) per inch, each 33 microns wide, for developing 44,644,320 intensity values for completely defining the image. Alternatively, instead of developing digital intensity data from a film image, the imaging system may directly develop digital image intensity data representative of a radiographic image, by using, for example, a CCD rectangular array device, associated with the image detector, which is serially read out for directly providing the image intensity values representative of the radiograph. These intensity values, however developed, are then stored in image data memory 5 in a manner so as to retain information relating to the spatial position of each of the intensity values in the original film or digital image.

A microprocessor 7 is programmed and operated by a user input and control device 9 so as to read and manipulate only the image intensity data in memory 5 needed in accordance with steps 10–30 of the flow chart illustrated for a preferred embodiment of the present invention. Once the mask image is developed having the ROI highlighted therein, it can be provided to output 11, such as a display, to verify to the user that the desired ROI has in fact been correctly found. Furthermore, the grid positions in the mask image which are representative of the found ROI can be applied to output 11, for use by a further microprocessor (not shown) which uses this information in order to retrieve from image data memory 5 only the image intensity data representative of the desired ROI. Thereafter, this further microprocessor can use this reduced set of image intensity data for providing computer-aided texture analysis for finding, for example, biological abnormalities in the digital image.

Thus, there has been shown and described a novel ROI finder which satisfies all the objects and advantages sought. Many changes, modifications, variations and other uses and applications of the subject invention will, however, become apparent to those skilled in the art after considering this specification and its accompanying drawings, which disclose preferred embodiments thereof. For example, although in the illustrated preferred embodiment of the apparatus shown in FIG. 13 a single memory 5 is shown, an additional memory can also be associated with microprocessor 7, as is well known, or with output 11, for storing the thumbnail and/or mask images. In this regard, it should be understood that as used herein, the terms "creating" or "defining" a thumbnail and/or mask image does not necessarily require display of the image, just the obtaining of the sub-set of the intensity data which is representative of the image.

Also, in a more generalized alternative embodiment it is not necessary to assume that large sharp-edged objects will be vertically or horizontally oriented and therefore that the best lines along which to measure the percentage of above-threshold grid points in step 24 are correspondingly horizontal or vertical. In general, this invention can measure the percentage of above-threshold grid points along lines oriented at any angle, for example at each angle which is a multiple of 10 degrees. At each angle, if any region of adjacent lines meets absolute size criteria instead of the percentage criteria in (a) through (c) under step 24, the invention can set all grid points in the region to 0.

Figure 14A:
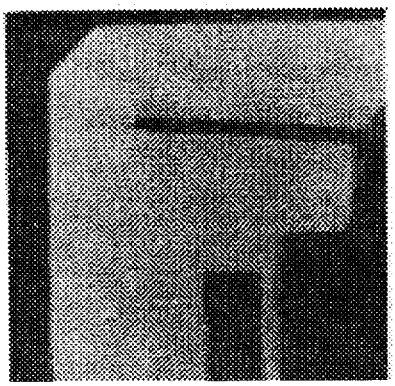
FIGS. 14a and 14b illustrate a digital spot-compression image, and a mask image created therefrom in accordance with the principles of the present invention.
Figure 14B:
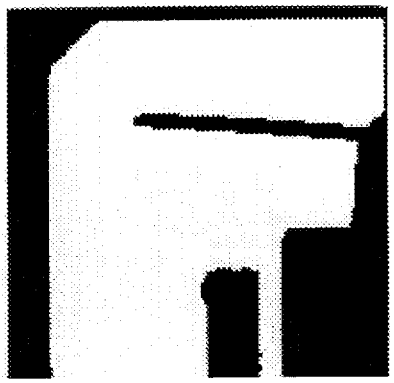

Furthermore, although in the illustrated preferred embodiment at step 24 of FIG. 2, large sharp-edged objects were eliminated, in an alternative embodiment of the invention useful for finding a region of interest having large sharp-edged objects, such as a spot-compression image developed during breast mammography, step 24 would be eliminated. In this regard, FIG. 14A illustrates input of a digital spot compression mammogram image to image data memory 5, and FIG. 14B illustrates the mask image created after processing of the digital image data in accordance with the present invention, wherein step 24 has been deleted, or modified so as to not apply (e.g., P=200%). Note that all non-breast portions of the digital data have been deleted, most notably the biopsy needle (the diagonal line in the image), as well as equipment associated with the biopsy device. All such changes, modifications, variations and other uses and applications which do not depart from the invention as described and claimed herein are deemed to be covered by this patent, which is limited only by the claims which follow as interpreted in light of the foregoing description.

I claim:

1. A method for automatically locating a desired region of interest (ROI) in an original digital image comprising a plurality of image pixels having a corresponding plurality of pixel intensity values, comprising:

(a) obtaining digital image intensity data representative of said original digital image;

(b) sampling the digital image intensity data representative of said original digital image so as to define a reduced digital image representative of said original digital image, said reduced digital image comprising a sub-set of the digital image intensity data representative of a reduced resolution of the original digital image;

(c) forming a histogram using said sub-set of digital image intensity data, wherein one axis of said histogram indicates increasing image intensity value and an orthogonal axis of said histogram indicates increasing image pixel count;

(d) determining a threshold image intensity value from said histogram as being representative of a minimum image intensity value that can possibly be from a desired ROI;

(e) creating a mask image from said sub-set of digital image intensity data, said mask image having image pixels at grid coordinate positions corresponding to similarly positioned pixels in said original digital image that were sampled for forming said reduced digital image, by setting all image pixels in a mask image grid to one of at least a maximum and a minimum intensity value, depending upon a comparison of the threshold intensity value to the image intensity value of a correspondingly positioned pixel in the reduced digital image, and (f) processing said mask image so as to define at least one contiguous area of pixels in said mask image having a common intensity value, said at least one area comprising the desired ROI.

2. The method of claim 1, wherein step (a) includes a step of compressing the digital image intensity data.

3. The method of claim 2, wherein said compressing step includes the step of applying the digital image intensity data to a look-up table.

4. The method of claim 3, wherein said compressing step is performed adaptively so as to apply a predetermined compression to said digital image intensity data independently of how many bits are used to define the digital image intensity data.

5. The method of claim 2, wherein said compressing step comprises at least a log base 10 compression of said digital image intensity data.

6. The method of claim 1, wherein step (b) is performed adaptively so as to provide a predetermined image resolution for said reduced digital image.

7. The method of claim 1, wherein step (d) comprises:

(d1) determining a point in said histogram representative of a noise peak in said image intensity data; and (d2) processing said histogram so as to find as said threshold intensity value that image intensity value wherein a portion of said processed histogram that follows said noise peak first exhibits a change to a positive curvature.

8. The method of claim 1, wherein:

step (f) defines in said mask image a plurality of areas of contiguous pixels having a common intensity value as possible ROI's, and includes an area reduction step for processing of said mask image so as to expand background regions that either border or are internal to all possible ROI's, thereby reducing the chances that adjacent possible ROI's are not separately defined.

9. The method of claim 8, wherein step (f) includes a selecting step for selecting as the desired ROI the largest of the possible ROI's remaining in the mask image after said area reduction step.

10. The method of claim 8, wherein said area reduction step also includes a shape eliminator step for eliminating from said mask image those possible ROI's having shapes known to not exist in the desired ROI.

11. Apparatus for automatically locating a desired region of interest (ROI) in an original digital image comprising a plurality of image pixels having a corresponding plurality of pixel intensity values, comprising:

(a) means for obtaining digital image intensity data representative of said original digital image;

(b) means for sampling the digital image intensity data representative of said original digital image so as to create a reduced digital image representative of said original digital image, said reduced digital image comprising a sub-set of the digital image intensity data representative of a reduced resolution of the original digital image;

(c) means for forming a histogram using said sub-set of digital image intensity data, wherein one axis of said histogram indicates increasing image intensity value and an orthogonal axis of said histogram indicates increasing image pixel count;

(d) means for determining a threshold image intensity value from said histogram as being representative of a minimum image intensity value that can possibly be from a desired ROI;

(e) means for creating a mask image from said sub-set of digital image intensity data, said mask image having image pixels at grid coordinate positions corresponding to similarly positioned pixels in said original digital image that were sampled for forming said reduced digital image, by setting all image pixels in a mask image grid to one of at least a maximum and a minimum intensity value, depending upon a comparison of the threshold intensity value to the image intensity value of a correspondingly positioned pixel in the reduced digital image;

(f) a processor for processing said mask image so as to define at least one contiguous area of pixels in said mask image having a common intensity value, said at least one area comprising the desired ROI.

12. Apparatus in accordance with claim 11, wherein said processor processes the intensity values of said mask image so as to define in said mask image a plurality of areas of contiguous pixels having a common intensity value as possible ROI's, and further processes the intensity values of said mask image so as to expand background regions that either border or are internal to all possible ROI's, thereby reducing the chances that adjacent possible ROI's are not separately defined.

13. Apparatus in accordance with claim 12, including a selecting means for selecting as the desired ROI the largest of the possible ROI's remaining in the mask image after said further processing of the intensity values of said mask image.

14. Apparatus in accordance with claim 13, wherein said further processing also includes processing for eliminating from said mask image those possible ROI's having shapes known to not exist in the desired ROI.

15. Apparatus in accordance with claim 11, wherein said means for obtaining includes image compression means for applying the digital intensity values used for forming said histogram to a look-up table for compressing the image intensity data.

16. Apparatus in accordance with claim 15, wherein said look-up table is programmed to apply a predetermined compression to said image intensity values independent of how many bits are used to define the image intensity values.

17. Apparatus in accordance with claim 15, wherein said compression step comprises at least a log base 10 compression of said digital image intensity data.

* * * * *